(12) United States Patent
Kendrena et al.

(10) Patent No.: US 9,378,251 B2
(45) Date of Patent: Jun. 28, 2016

(54) SYSTEMS AND METHODS FOR CATEGORIZING AND PRESENTING PERFORMANCE ASSESSMENT DATA

(71) Applicants: Kenny Kendrena, Chino Hills, CA (US); John G Donchetz, Savage, MN (US); Randall Rupert Istre, Minneapolis, MN (US)

(72) Inventors: Kenny Kendrena, Chino Hills, CA (US); John G Donchetz, Savage, MN (US); Randall Rupert Istre, Minneapolis, MN (US)

( * ) Notice: Subject to any disclaimer, the term of this patent is extended or adjusted under 35 U.S.C. 154(b) by 0 days.

(21) Appl. No.: 14/548,211

(22) Filed: Nov. 19, 2014

(65) Prior Publication Data

US 2015/0142793 A1    May 21, 2015

Related U.S. Application Data

(63) Continuation of application No. 14/069,256, filed on Oct. 31, 2013, now abandoned, which is a continuation of application No. 13/611,188, filed on Sep. 12, 2012, now abandoned.

(60) Provisional application No. 61/533,936, filed on Sep. 13, 2011.

(51) Int. Cl.
*G06F 17/30* (2006.01)
*G06Q 10/04* (2012.01)

(52) U.S. Cl.
CPC .... *G06F 17/30539* (2013.01); *G06F 17/30563* (2013.01); *G06F 17/30598* (2013.01); *G06Q 10/04* (2013.01)

(58) Field of Classification Search
None
See application file for complete search history.

(56) References Cited

U.S. PATENT DOCUMENTS

| 7,689,437 | B1 | 3/2010 | Teller et al. |
| 8,515,737 | B2 | 8/2013 | Allen |
| 2010/0283630 | A1 | 11/2010 | Alonso |
| 2012/0047219 | A1 | 2/2012 | Feng et al. |

OTHER PUBLICATIONS

Bhandari, I., et al., "Advanced Scout: Data Mining and Knowledge Discovery in NBA Data", Data Mining and Knowledge Discovery, 1997, vol. 1, No. 1, pp. 121-125.

*Primary Examiner* — Alex Gofman
*Assistant Examiner* — Umar Mian
(74) *Attorney, Agent, or Firm* — One LLP

(57) ABSTRACT

The field of the invention relates to systems and methods for data mining and processing, and more particularly to systems and methods for automating content from performance assessment data. In one embodiment, an automated notes and categorization system may include a primary database comprising performance assessment data. The primary database is operatively coupled to a computer program product having a computer-usable medium having a sequence of instructions which, when executed by a processor, causes said processor to execute a process that analyzes and converts raw performance data into automated content that presents data in readable user friendly form to facilitate human understanding.

6 Claims, 15 Drawing Sheets

Fig. 5b

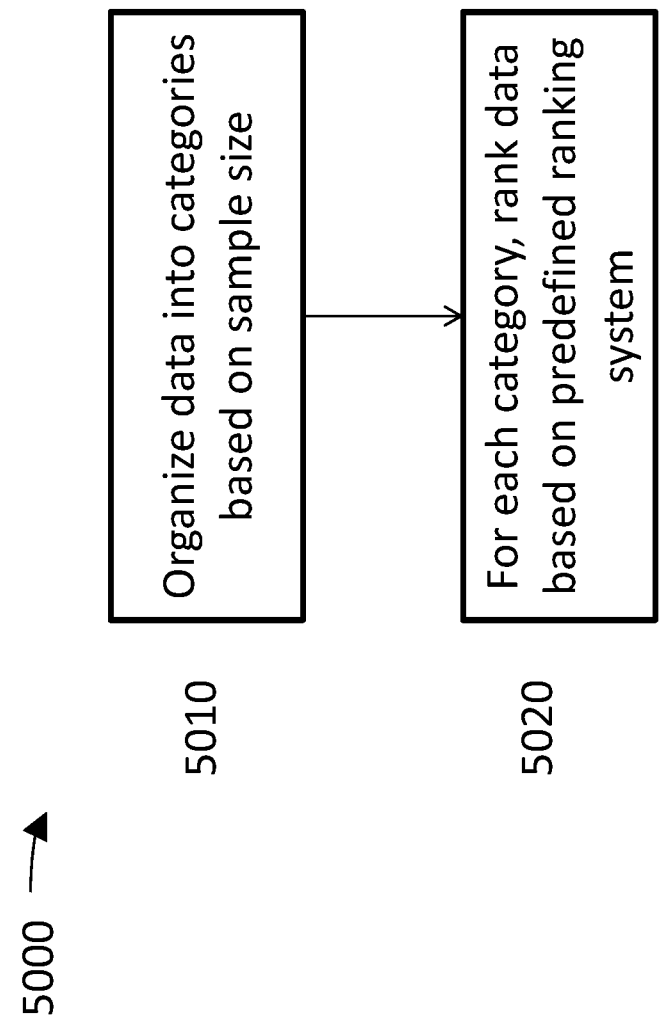

Bill Kingman (The Kingmen)
2nd place (82-74-11)

Insider extras
My Triumphs and Failures | Report Card

Manager Report Card

| Draft Grade A- | Detail | Grade |
|---|---|---|
| Hitters Kept | I drafted 10 hitters and have dropped 4 of them | D |
| Pitchers Kept | I drafted 11 pitchers and have dropped 6 of them | D |
| Drafted Hitter Performance | Hitters I drafted and still are batting a combined .320 | A |
| | Hitters I drafted and no longer own are batting a combined .210 | A |
| Drafted Pitcher Performance | Pitchers I drafted and still own have a combined ERA of 2.96 | A |
| | Pitchers I drafted and no longer own have a combined ERA of 4.72 | A |
| Best Sleeper Pick (hitter) | Cameron Maybin (2nd round) .291 BAVG, 31 SB | A |
| Best Sleeper Pick (pitcher) | Daniel Hudson (4th round) 2.91 ERA | A |
| Add/Drops Grade B- | Detail | Grade |
| Hitter Acquisitions | Hitters I've Acquired (6) have batted .276 for my team with 12 HR in 523 AB | B |
| Hitter Drops | Hitters I've Dropped (11) have batted .200 with 21 HR in 329 AB since being waived | C |
| Pitcher Acquisitions | Pitchers I've added (13) have 3.22 ERA in 97 IP for my team | A |
| Pitcher Drops | Pitchers I've Dropped (12) have 4.17 ERA in 101 IP since being waived | B+ |
| Trades Grade B | Detail | Grade |
| Traded Hitter Performance | Hitters I traded for have batted .305 and hit 9 HR in 330 AB since joining my team | A |
| | Hitters I traded away have batted .260 with 3 HR in 225 AB since leaving my team | A |
| Traded Pitcher Performance | Pitchers I traded for have an ERA of 2.33 in 47 IP since joining my team | A+ |
| | Pitchers I traded away have an ERA of 4.11 in 19 IP since leaving my team | A+ |

Fig. 7f

League Luck Ratings

| Current Standing | Team | Luck Rating | Injured Players | Average Injured Player Ranks | Strength of Schedule | Luck Adjusted Standing |
|---|---|---|---|---|---|---|
| 1 | Ragin Cajuns | | 1 | 188 | 10 | 4 |
| 2 | The Kingmen | | 8 | 85 | 2 | 1 |
| 3 | Rabins | | 3 | 31 | 5 | 7 |
| 4 | Wisconians | | 6 | 87 | 3 | 2 |
| 5 | Presidents | | 3 | 120 | 8 | 8 |
| 6 | C-Lo's Crew | | 4 | 156 | 6 | 9 |
| 7 | Allentown | | 5 | 103 | 4 | 6 |
| 8 | Savage Rockers | | 10 | 82 | 1 | 5 |
| 9 | Superfriends | | 2 | 148 | 7 | 10 |
| 10 | Doug's Dominators | | 6 | 72 | 9 | 3 |

The Ragin Cajuns have been the luckiest team, with only 1 injured player (ranked 188) and the easiest strength of schedule.

The Kingmen have been least lucky, with 8 injured players (avg ranking 82) and the second-toughest strength of schedule.

Description:

* Avg. Injured Player Rank is from drafted players and pickups who were on roster for more than 2 weeks prior to injury. It is their combined average ranking in the Player Rater.
* Luck Adjusted Standing is the standings if this head-to-head league were played with Roto-style scoring, where the points are determined by the totals to date, rather than head-to-head wins and losses.

Fig. 7g

SYSTEMS AND METHODS FOR CATEGORIZING AND PRESENTING PERFORMANCE ASSESSMENT DATA

RELATED APPLICATIONS

This application is a continuation of U.S. patent application Ser. No. 14/069,256, filed Oct. 31, 2013, which is a continuation of U.S. patent application Ser. No. 13/611,188, filed Sep. 12, 2012, which is related to U.S. Provisional Application No. 61/533,936, filed Sep. 13, 2011, which is hereby incorporated by reference.

FIELD OF THE INVENTION

The field of the invention relates to systems and methods for data mining and processing, and more particularly to systems and methods for automating content from performance assessment data.

BACKGROUND OF THE INVENTION

Performance assessment data is an important aspect of the business, analysis, and appreciation of professional/fantasy sports, stock markets, mutual funds, personal fitness, student education, video gaming, consumer sales, and so on. Athletic teams, coaches, scouts, agents, and fans evaluate performance data and statistics for comparing the performance of teams and individual athletes. Game strategy and player potential are often based on predictive models using this data. Similarly, organizations and individuals evaluate corporate performance data to rank performance, reward good performance, and provide development assistance. Student test scores are also used to evaluate educational strategy; fitness and health statistics are monitored for efficient personal training; and financial charts are analyzed to alleviate stock risks. The advantages of data processing and analysis are well understood and appreciated. However, data processing and analysis is not always user friendly as understanding a large amount of structured data is a daunting task.

One approach for making sense of raw performance data relies on human expertise. For example, in the area of athletics, domain experts (e.g., coaches, scouts, managers, analysts, statisticians etc.) are typically relied on to effectively convert raw data into human readable/useful knowledge. Batting averages, field goal percentages, successive streaks are considered, inter alia, to determine success against certain players or potential against future opponents. Human domain experts can "humanize" this raw data and convert numbers and statistics into insightful prose/narrative. But, effectively analyzing performance data requires consideration of incredible amounts of information to reduce variable uncertainty. Bulk number crunching becomes a difficult task when the valuable insight is drowned in a sea of numbers and statistics. Therefore, this manual based approach to identifying performance metrics consumes both time and resources.

In another example, the popularity of fantasy sports has converted millions of fans into expert statisticians for scrutinizing a professional athlete's performance data. Fantasy leagues allow the virtual assembly of teams comprising actual athletes to compete with other virtual teams based upon those players' real-life performance. The sports and players represented through fantasy games are widespread. The number of applications providing fantasy leagues, often over the Internet, is similarly extensive. However, each may provide a unique way of scoring and rewarding player performance. Accordingly, the value of each player's performance data may vary across different leagues and sports.

Advancements in technology and computerized data processing have made a wealth of performance statistics readily available for coaches and fantasy owners alike to review. Individual player statistics may give insight to an athlete's speed, movement, skills, and agility against one or more opponents. However, processing this data and placing value on relevant statistics varies between managers, leagues, and sports. Manually digesting performance data can be cumbersome in light of the current number of statistical categories monitored. As the type and number of data collected increased, more practical methods were developed for useful volumetric data processing.

In one approach for volumetric processing of raw performance statistics, predictive modeling systems are used. Using a more automated approach to analyze a large quantity of data, an example modeling system associated with fantasy sports leagues is disclosed in U.S. patent application Ser. No. 12/111,054, U.S. Publication No. 2008/0281444 A1, filed Apr. 28, 2008, to Krieger et al. for a "Predictive Modeling System and Method for Fantasy Sports," which is hereby incorporated by reference in its entirety. This system contemplates a predictive modeling engine for generating relationships among player data and provides projections based on the relationships.

However, current systems for predictive analytics typically generalize known patterns to new data for projecting player performances. Additionally, these predictive modeling systems rarely consider the unique priority various users place on certain data sets. The predictive results are typically as hard to digest and read as the raw data itself to the average human user.

In contrast to generalizing known patterns to new data, data mining emphasizes discovering previously unknown patterns in new data sets. Data mining has recently experienced growth in the area of performance assessment. Performance assessment benefits from discovering unknown strengths and weaknesses as opposed to assessing patterns of current performance. The advantages of domain experts (e.g., coaches, teachers, interactive gamers, and the like) in analyzing performance metrics are based on the inherent expertise of these individuals to detect unknown patterns through subjective approaches. Therefore, an effective method of automatically analyzing performance assessment data enhances alternative statistical evaluation with data mining to discover patterns that are systematically difficult to detect, especially when dealing with dynamic data sets.

Additionally, current systems modeling performance assessment may not provide results in a user-friendly manner, as discussed above. Supplemental tables and graphs are often created to reflect the results of predictive modeling and still require additional processing and analysis. Subjective priority is neither accounted for nor presented and additional steps of manual data processing required. Accordingly, an improved system and method for automated processing, categorizing, and presenting performance assessment data is desirable.

SUMMARY OF THE INVENTION

The field of the invention relates to systems and methods for data mining and processing, and more particularly to systems and methods for automating performance content from performance assessment data. In one embodiment, an automated notes and categorization system may include a primary database comprising performance assessment data.

The primary database is operatively coupled to a computer program product having a computer-usable medium having a sequence of instructions which, when executed by a processor, causes said processor to execute a process that analyzes and converts raw performance data. The system further includes a processed database for storing the processed data operatively coupled to the computer program product for use with various user applications.

The process includes the steps of data mining said performance assessment data to obtain summarized data; prioritizing summarized data based on user-defined weight values for a plurality of classification categories; and converting results of the prioritization into plain language notes. The automated plain language notes will facilitate human understanding by presenting the data in narrative fashion.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 5b is another example of a user interface for a football application of the performance assessment application;

FIG. 6 is another flowchart detailing another electronic process in accordance with a preferred embodiment of the present invention;

FIGS. 7a-g are other examples of user interfaces of the performance assessment application.

DETAILED DESCRIPTION OF THE PREFERRED EMBODIMENTS

Figure 1:
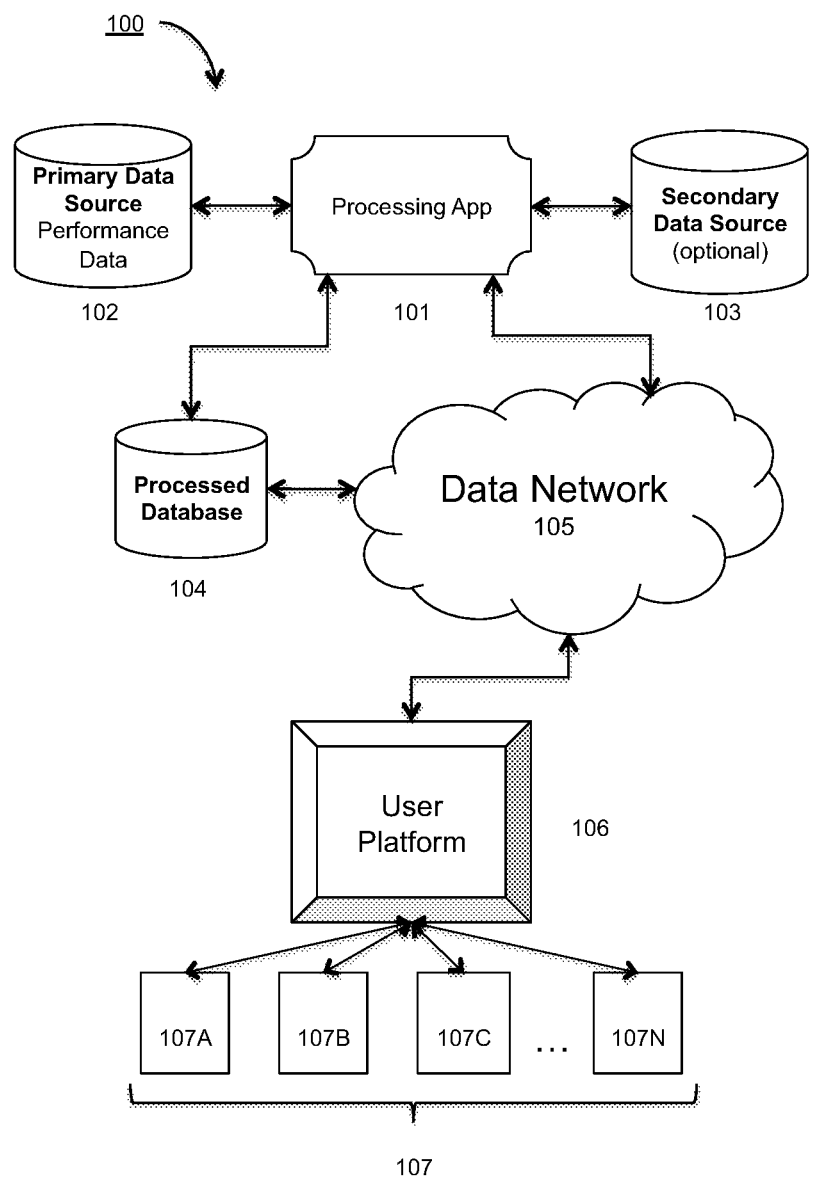
FIG. 1 is a schematic diagram of a data processing system for use with performance assessment data according to one embedment of the present invention.

As described above, an incredible amount of performance assessment data exists across a number of domains of athletics, interactive gaming, physical fitness, finance, and so on. Evaluating this performance data for decision-making criteria is an integral part for seeking a competitive edge in each of these domains. Turning to FIG. 1, an exemplary system 100 is illustrated to make sense of raw performance data and convert said data into actionable knowledge, according to one embodiment of the present invention. The system 100 has a processing application 101 that is communicatively coupled to primary data source 102. As is known in the art, processing application 101 may represent a computer, which includes a computer-usable storage medium, such as in a server, having sequence of instructions which, when executed by a processor, causes said processor to execute a process that converts raw performance data into information that is both digestible and prioritized.

The processing application 101 may further include a user interface console, such as a touch screen monitor (not shown), to allow the user/operator to preset various system parameters. User defined system parameters may include, but are not limited to, assigning categorical priorities, assigning priority weights, adjusting time-frame analysis, and setting split variables.

In one embodiment, primary data source 102 is used for the storage of primary performance assessment data. For example, National Football League (NFL) statistics, Major League Baseball (MLB) statistics, stock market data, personal fitness goals, and other performance data may be stored within data source 102. The data may be historical or live (real-time) data. In an alternative embodiment of the present disclosure, an optional secondary data source 103 is communicatively coupled to processing application 101. Accordingly, the performance data provided to application 101 is not limited to primary performance data and may optionally include user-generated (or secondary) data, which is generally defined as performance data that is based on the primary performance information. An example of secondary data includes the performance of a fantasy football or baseball team. As fantasy participants claim players off of waivers, alter lineups, make draft decisions, and watch their fantasy teams perform, user-generated/secondary data is produced to assess the performance of the fantasy team and players based on the primary performance data reflecting the actual player statistics. Another example user generated performance data includes stock market simulation games, where users play with pretend investment dollars.

As those of ordinary skill in the art would appreciate, primary data source 102 as well as secondary data source 103 may be any type of storage device or storage medium such as hard disks, cloud storage, CD-ROMs, flash memory and DRAM. In other embodiments, it should be understood that processing application 101, primary data source 102, and secondary data source 103 could reside on the same computing device or on different computing devices. Similarly, the performance data of primary data source 102 and/or secondary data source 103 could be stored within the processing application 101 or some other accessible server or data storage device.

The system 100 further includes a processed database 104 coupled to the processing application 101 for storing processed data results of the application 101. Similar to data sources 102/103 as discussed above, database 104 may be any type of storage device or storage medium such as hard disks, cloud storage, CD-ROMs, flash memory and DRAM. The database 104 can also reside on the same computing device as data sources 102/103, processing application 101, or some other accessible server or data storage device. Both processing application 101 and database 104 are accessible over data network 105. Data network 105 can pertain to a global data network (e.g., the Internet), a regional data network, or a local area network. Furthermore, the network 105 can also include one or more wired or wireless networks.

User platform 106 accesses the services provided by processing application 101 as well as the processed performance data stored in database 104 via network 105. Platform 106 represents a variety of local or online applications where performance assessment is involved. Some examples include, but are not limited to, professional sports, fantasy sports, interactive gaming, physical fitness, social networking, stock markets, mutual funds, educational evaluation, and consumer sales.

A user, or plurality of users, 107 of user platform 106 accesses the performance assessment data using client devices, for example 107A, 107B, 107C and 107N, over data network 105. These client devices may be computing devices such as laptops, desktops, cellular phones, personal digital assistants (PDA), set top boxes, and so on. Communication with the data network 105 can occur through a network data link, which can be a wired link and/or a wireless link. As is well known in the art, one or more of the users 107 may also communicate with the processing application 101 or processed database 104 directly.

Data sources 102/103 are configured to store one or more elements of raw performance data. However, as discussed above, as the number of statistical data stored increases, converting the data to useable knowledge can be time consuming and resource inefficient. Predictive models based on raw data must still be evaluated and, often, are not easily understood.

Figure 2:
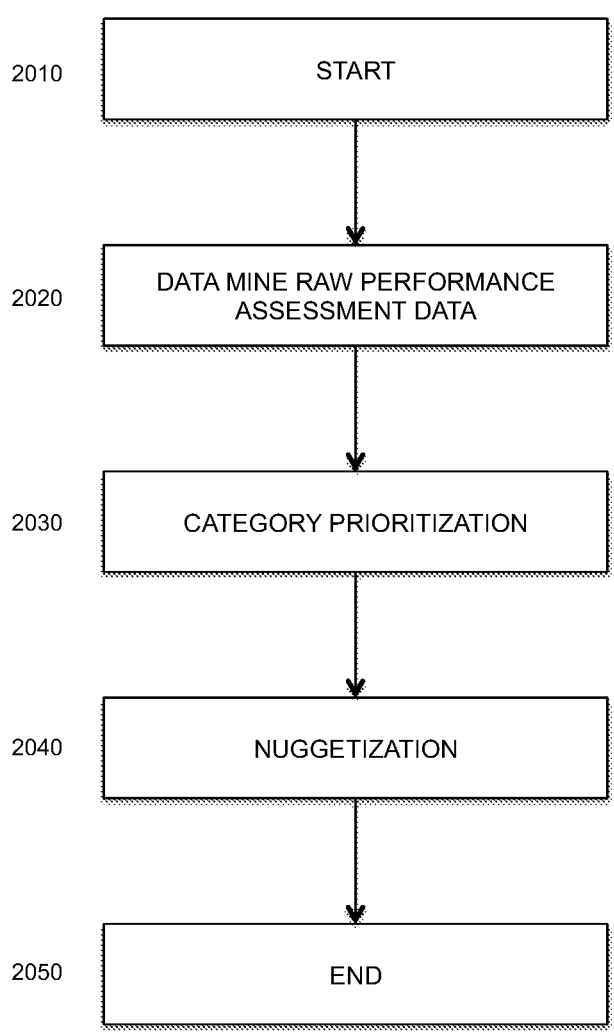
FIG. 2 is a flowchart of an electronic process in accordance with a preferred embodiment of the present invention.

One approach to address this issue is shown in FIG. 2, which illustrates a process 2000 that may be executed by system 100. Process 2000 begins with raw performance data (starting block 2010), such as the data maintained in data sources 102/103.

This raw data subsequently undergoes three major processing steps: (1) data mining (action block 2020); (2) category prioritization (action block 2030); and (3) nuggetization (action block 2040). As a result of process 2000, automated notes are created from the raw data that facilitates performance assessment in a user-friendly approach.

Figure 3:
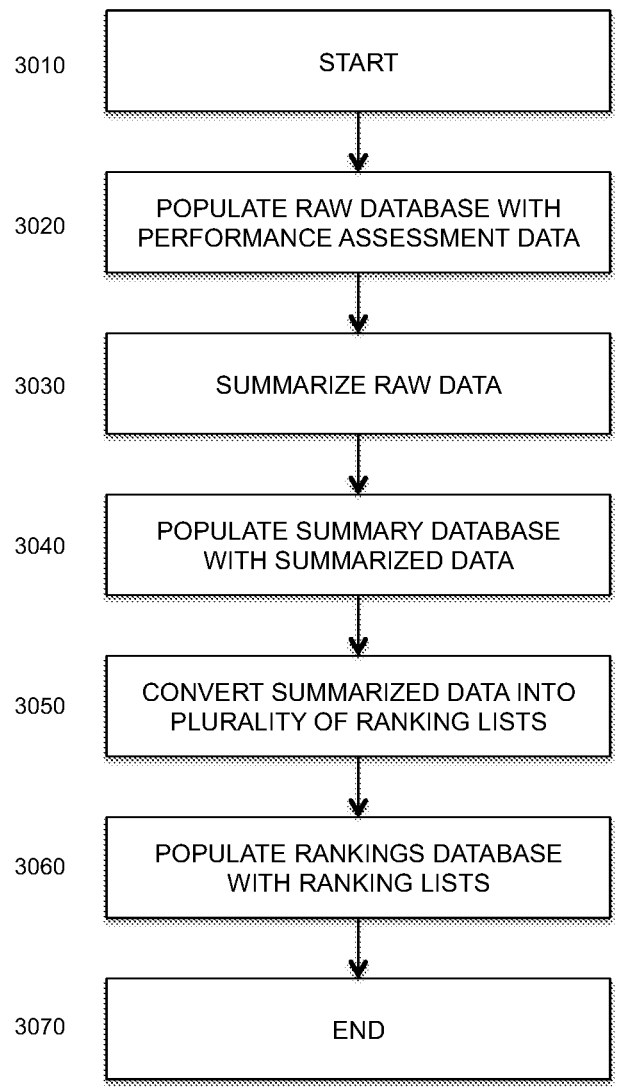
FIG. 3 is a flowchart further detailing the electronic process shown in FIG. 2 in accordance with a preferred embodiment of the present invention.

In order to harness a wealth of raw performance information, process 2000 uses data mining techniques to process and summarize raw data (action block 2020). With reference now to FIG. 3, start block 3010 begins by collecting raw data associated with performance assessment and populating the Primary Data Source 102 (action block 3020). Current systems and methods exist for acquiring, collecting, exporting and delivering performance assessment data. Furthermore, real-time performance data can be delivered, for example, using real-time locating systems (RTLS) and real-time sensing systems (RTSS) with RF technology. Local data can be acquired using sensors to measure physiological parameters as well as other empirical data. Additional information on data acquisition/collection methods and techniques can be found, for example, in U.S. Pat. No. 7,689,437 to Teller et al., filed Jun. 16, 2000 for a "System for Monitoring Health, Wellness and Fitness," and U.S. patent application Ser. No. 12/772,599, U.S. Publication No. 2010/0283630 A1, filed May 3, 2010, for "Sports Telemetry System for Collecting Performance Metrics and Data"—both of which are incorporated by reference herewith in their entirety. Although other methods for collecting data are available, existing databases compiled with performance assessment data may also be used from known services, such as, the Associated Press (AP), ESPN, Stats, Inc., Sports Data, Google Finance and Yahoo Finance, etc.

Once the raw data is available for processing, process 2000 subsequently summarizes the raw data into predefined categories for further processing (action block 3030). Using the sport of football as an example, this raw data is summarized into two categories: (i) Statistics (e.g., pass attempts, completions, touchdowns, etc.) for players and teams; and (ii) Splits (e.g., by time-frame, opponent, side of field, time of game). Table 1 illustrates another example using baseball where raw data from Data Source 102 may include information about a single player's at-bat:

TABLE 1

| GameID | PlayerID | BSCount | PitchType | PitchResult | PrimaryEvent | Etc. |
|---|---|---|---|---|---|---|
| 22232 | 99921 | 0-0 | 1 | Missed | | |
| 22232 | 99921 | 0-1 | 1 | Ball | | |
| 22232 | 99921 | 101 | 2 | Well-Hit | GO | |

Each pitch of a single at-bat in Game 22232 for Player ID 99921 is shown in Table 1. Summarizing this raw data in action block 3030, Table 2 illustrates an example of summarized data for three players over one game whose raw data is similar to that shown in Table 1:

TABLE 2

| Date | PlayerID | Hits | At-Bats | Walks | RBI | Etc. |
|---|---|---|---|---|---|---|
| Jun. 11, 2011 | 99921 | 1 | 4 | 1 | 1 | |
| Jun. 11, 2011 | 99923 | 0 | 3 | 0 | 0 | |
| Jun. 11, 2011 | 99926 | 2 | 3 | 1 | 2 | |

This summarized data is stored in processed database 104 (action block 3040). Once the processed database is populated with summarized data, the data is then filtered and prioritized (action block 3050). Irrelevant or least relevant data is removed and relevant data is flagged and assigned priority values (i.e., weight values) within defined categories. Turning to FIG. 6, an illustration of a process 5000 for filtering and prioritizing the data is shown. First, for each category, the sample size is assessed to determine whether the sample size is sufficiently large to provide meaningful analysis, e.g., if the sample size meets a pre-defined threshold (Action Block 5010). For instance, in the case of batting averages, players are grouped based on number of at-bat attempts in top, middle, and bottom tiers:

Bucket 1=subjects ranking in the 60th percentile or higher attempts

Bucket 2=subjects ranking in the 16th-59th percentile in attempts

Bucket 3=subjects ranking in the bottom 15th percentile in attempts

In this example, the players in "Bucket 3" are excluded from further analysis due to insufficient sample size. The data within each bucket is then ranked (Action Block 5020). An illustration of filtering and ranking is shown below:

| Player | BAVG | AB | BAVG Rk | Bucket | Bucket Pcntl |
|---|---|---|---|---|---|
| McCutchen, Andrew | .362 | 417 | 1 | 1 | 100 |
| Kemp, Matt | .358 | 240 | 2 | 1 | 99.5 |
| Smoak, Justin | .189 | 344 | 232 | 1 | 0.4 |
| Buck, John | .184 | 277 | 233 | 1 | 0 |
| Ciriaco, Pedro | .337 | 89 | 1 | 2 | 100 |
| Dirks, Andy | .333 | 168 | 2 | 2 | 99.4 |
| Coghlan, Chris | .140 | 93 | 172 | 2 | 0.5 |
| Conrad, Brooks | .133 | 98 | 173 | 2 | 0 |
| Perez, Hernan | .500 | 2 | 1 | 3 | 100 |
| Carrera, Ezequiel | .414 | 29 | 2 | 3 | 99.4 |
| Bianchi, Jeff | .000 | 13 | 161 | 3 | 0 |
| Vogt, Stephen | .000 | 17 | 161 | 3 | 0 |

Another example of ranking data, using the examples provided in Tables 1 and 2 above, is presented in Table 3:

TABLE 3

| PlyerID | StrtDate | EndDate | OvrlHits | Ovrl At-Bats | Ovrl Hits Rk | Hits - fastball | AB - fastball | BAVG - FB Rk |
|---|---|---|---|---|---|---|---|---|
| 99921 | Jun. 1, 2011 | Jun. 11, 2011 | 6 | 18 | 190 | 6 | 12 | 10 |
| 99923 | Jun. 1, 2011 | Jun. 11, 2011 | 11 | 35 | 32 | 8 | 29 | 36 |
| 99926 | Jun. 1, 2011 | Jun. 11, 2011 | 2 | 21 | 281 | 1 | 15 | 265 |
| 99935 | Jun. 1, 2011 | Jun. 11, 2011 | 0 | 1 | 450 | 0 | 1 | 450 |

In this example, the players are ranked according to both their overall batting average (i.e., the ratio of total hits versus total at-bats) as well as their fastball batting average (i.e., the ratio of hits versus fastballs at-bats). As Table 3 also illustrates, the data is not only summarized using statistics (e.g., at-bats and hits), but also using splits (e.g., time-frame split reflecting only games between Jun. 6, 2011 to Jun. 11, 2011). A plurality of ranked tables covering various timeframes and splits for the summarized data is created (not shown) similar to Table 3. This plurality of ranked data is then stored in Processed Database 104 (action block 3060) for use with category prioritization (end block 3070). As will be demonstrated below, this information will enable the system 100 to generate noteworthy data and trends not provided by previous systems known in the art.

Turning back to FIG. 2, category prioritization (action block 2030) classifies performance data using application specific schemes. Generally, in one embodiment, the standard classification schemes include seven categories: (1) granularity; (2) sample size significance; (3) performance extremes; (4) positive/negative impact; (5) circumstantial significance; (6) performance or tendency; and (7) comparison between timeframes. This classification scheme can also vary based on user input to processing application 101.

Applying this standard scheme to baseball, for example, (1) granularity indicates the level of detail for a specific statistic. For instance, the more splits, the more granular. Further, the lower average denominator for a category, the more granular the category tends to be. Some categories may be granular by nature, e.g., miss percentage of swings may be more granular than overall batting average. Further, overall batting average would not be as granular as fastball batting average in the example above. (2) Sample size significance determines the relevance of each category based on the sample size ("attempts"), such that 250 overall at-bats are more significant than 120 overall at-bats. For instance, in the "Bucket" example above, sample size significance is illustrated below:

| STAT (Category) | Bucket 1 Minimum Denominator | Bucket 1 Max Denominator |
|---|---|---|
| Overall Batting Average | 240 | 488 |
| Fastball Slugging Percentage | 160 | 320 |
| Breaking Ball Miss Percentage | 223 | 465 |
| Changeup Batting Average | 87 | 125 |

Sorting the list above by column 2 (the minimum denominator to qualify as Bucket 1 as described previously) would effectively provide the sample size significance value. If the user chose to only view data with high sample size, then likely the categories Fastball Slugging Percentage and Changeup Batting Average in the table above would be excluded from the search results.

(3) Performance extremes identifies the statistically best and worst for each category (e.g., league leaders in batting average and the league worst in batting average have higher performance extreme values compared to those in the league in or around the average (50th percentile)). (4) Positive/negative impact reveals the influence of data to the performer (e.g., a 0.500 batting average against fastballs is positive to the player whereas a 0.100 batting average against fastballs is negative). Two factors will determine this in baseball statistics: whether a high number is good and what percentile the player falls into for that category. (5) Circumstantial significance reveals the influence of data in relation to circumstantial variables (e.g., notes and data regarding an upcoming opponent). This considers both the current state and the history state, such as opponent strength, weather, and whether a team is home or away.

(6) Performance or tendency: this category makes a distinction between whether the Stat (Category) is performance based or technique/strategy based. For example, batting average is performance measure, but Curveball Usage for a pitcher or Pass Attempt % of Plays for a football team are more tendency or technique based.

(7) Comparison between timeframes: with this category, data between different time frames may be compared. Under this category, the prioritization may be based, at least in part, on the differences between those time frames. For example, for Albert Pujols, if 2011 and 2012 are selected as compared ranges, under other prioritization schemes, priority of data may be based on comparison against league normal data. However, under this scheme, higher priority may be given to stats/data where Pujols 2012 is significantly different from Pujols 2011.

Category prioritization determines which information from the database 104 is relevant to a certain category and is then assigned a priority value within that category. For instance, from Table 3 above, Player 99921 is ranked 10th in the league in batting average versus fastballs since Jun. 1, 2011. This relevant data is flagged and assigned a note strength value for this category as shown in the table below:

| Player 9921 (BAVG—"Batting Average") | | | | | | | |
|---|---|---|---|---|---|---|---|
| Stat-Split Category | Timeframe | Size Bucket | Percentile Rank | Beginning Strength Value | Split Adjust | Size Bucket Adjust | Note Strength Value |
| BAVG High Pitches | 1 | 1 | 10 | 80 × | 1 × | 1 | 80 |
| BAVG Fastball | 1 | 1 | 90 | 80 × | 1 × | 1 | 80 |
| SLG High Pitches | 1 | 1 | 12 | 76 × | 0.1 × | 1 | 7.6 |
| BAVG Pitcher Ahead | 3 | 1 | 30 | 40 × | 1 × | 1 | 40 |
| BAVG LHP | 1 | 2 | 44 | 12 × | 1 × | 0.5 | 6 |
| Miss % Fastball | 4 | 1 | 52 | 4 × | 1 × | 1 | 4 |
| GB % Overall | 1 | 1 | 88 | 76 × | 1 × | 1 | 76 |
| Etc . . . | | | | | | | |

Note Strength Value is determined by a formula that considers the following three factors: 1) Percentile ranking for that stat category; 2) Sample size Bucket; and 3) the type of Split.

Beginning Strength Value=ABS(50−Percentile Ranking) *2. The highest possible strength value=100.

Split adjustment becomes 0.1 (or other value) multiplier through code that knows whether a stat category with the same split has already been given a higher Note Strength Value. For example, in the above table, this hitter ranks poorly (10th and 12th percentile, respectively) in two very similar Stat-Split categories: BAVG and SLG vs. "High Pitches". The program would apply a Split Adjustment to the SLG vs High Pitches to reduce its Note Strength Value because BAVG vs High Pitches already has a high Note Strength attached to it (80).

Size Bucket Adjustment can be used to reduce the Note Strength for stat categories where the subject falls into Size Bucket 2 or 3, meaning they do not have a significant sample size as those who were in Bucket 1 did.

Thus, in summarizing the table above, the two stat-split combinations with the highest Note Strength Values are: Batting Average against High Pitches and Groundball Percentage Overall. SLG vs. high pitches is a significant weakness for this player, but it's note value drops because his BAVG on high pitches is already higher in note priority. Categories such as BAVG LHP and Miss % of Fastball have low Note Strengths because the player was near the league average (near 50th percentile) in those areas.

Figure 4:
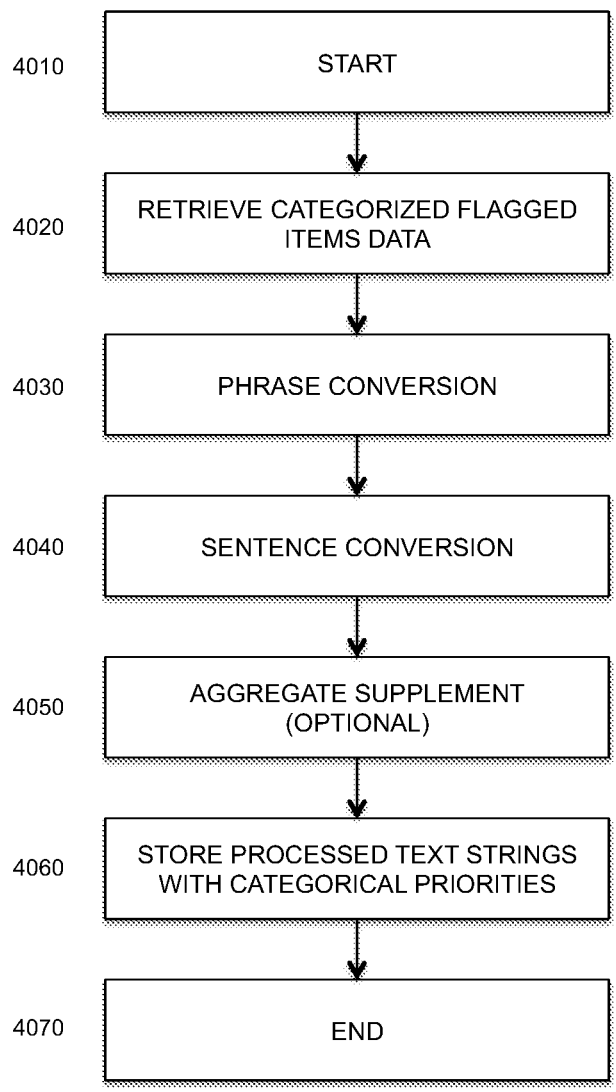
FIG. 4 is another flowchart further detailing the electronic process shown in FIG. 2 in accordance with a preferred embodiment of the present invention.

Once the remaining flagged items are assigned categorical priorities, process 2000 then converts (a.k.a., nuggetizes) the remaining filtered/prioritized data to text strings (action block 2040). With reference to FIG. 4, the data remaining in processed database 104 is obtained, each flagged data entry having a categorical priority value (start block 4010 and action block 4020). This data is converted to phrases (action block 4030) and these phrases are then processed into sentences (action block 4040), which can also be referred to as AutoNotes. These automated sentences are much more readable than the summarized data. The sentences are based on predefined strings. For example, for the metric, fastball first pitch taken percentage, the string would read as follows:

"Has taken your first pitch FB <Notable Zone><Numerator Notable Zone> of <Denominator Notable Zone> times". Thus, for notable data in this category, the output would be generated as follows: "Has taken your first pitch FB Down/Away 31 of 31 times."

Below are some additional examples using Joe Mauer v. Right Handed Pitchers:

Strength—Fastball (0.374) especially on first pitch (0.538). Changeup (0.288) especially when he's ahead (0.333).

Best 2-strike pitch is CH/OT Middle/Down (0 well-hit out of 10 strikes)

Has taken first-pitch FB Down/Away 31 of 34 times

Has not chased FB when thrown Middle/In (only 3 chased of 25 out-of-zone pitches)

Weakness—CH/OT has been effective when Middle/Middle (0 well-hit of 8 strikes)

Other examples using the data above produces sentences for player 99921 and player 99926:

"Nationals outfielder Joe Smith is 6-for-18 (0.333 batting average) since June 1."

"Joe Smith of the Nationals is batting 0.500 (6-for-12) against fastballs since June 1."

"Bob Jones of the White Sox has only 2 hits in his last 21 at-bats." As aggregate data (e.g., league average, national average, etc.) is also available, additional information may also supplement the sentence created in action block 4040 (action block 4050). For example, appending related batting average assessment for the league produces: "Joe Smith of the Nationals is batting 0.500 (6-for-12) against fastballs since June 1; the league average against fastballs is 0.282."

Each of these text strings and their associated priority values for each category are then stored in a separate database (not shown) (action block 4060). Alternatively, the text strings and their priority values may also be generated as needed. An example of stored text strings is illustrated in Table 5:

TABLE 5

| Subject | Note | Granularity | Sample Size | Perf. Extreme | Special Signif. | +/− to subject |
|---|---|---|---|---|---|---|
| Joe Smith | Joe Smith is 6-for-18 (0.333 batting average) since June 1. | 1 | 7 | 7 | 0 | 9 |
| Joe Smith | Joe Smith is batting 0.500 (6-for-12) against fastballs since June 1. | 7 | 8 | 9 | 0 | 10 |
| Joe Smith | Joe Smith is batting just 0.100 (2-for-20) against tonight's opposing starter. | 6 | 9 | 10 | 10 | 1 |

The presentation of such data can be configured in a variety of ways. For instance, an AutoNote can be generated for an individual as part of a specific group. For example, an AutoNote can be generated for his performance on his particular team: "Joe Smith leads all Twin hitters with 20 HRs."

The AutoNote may also reflect personal and/or team improvements. For example: Student X is averaging 90% on his geometry tests since December 1, when he was averaging 69% on his previous tests." Or "the Angels are batting 0.320 against breaking pitches in 2012 whereas they were batting 0.2000 against breaking pitches in 2011."

Trends and tendencies may also be presented in AutoNotes. For example, in the education setting, the system 100 can generate the following AutoNote: "Student X earned a score of 90% or better in 8 straight test grades." In football, an AutoNote may generate: "Running Back Frank Gore has run over 100 yards in 7 straight games." A trend may also be presented in the negative based on the noteworthy data above: "Derek Jeter has not hit a fastball in the last 10 games." Further, the dates of these trends and tendencies may be configured. For example, a user may select 2011 and 2012 such that the AutoNote generates: "Derek Jeter batted 0.160 versus right-handed breaking pitches in 2011 and batted 0.270 against right handed pitches in 2012." Moreover, the data generated from these two different timeframes may be compared and the data may be presented based at least in part on the "Comparison Between Timeframes" category prioritization scheme described above.

This data can then be used with a variety of user platforms 106 (end block 4070). For example, AutoNotes can be utilized with Twitter, Facebook messaging, or other social media and messaging platforms. AutoNotes enables the system 100 to discover and present note-worthy pieces of information about a performer, such as a player, a student, a company, or team, using user friendly language.

Figure 5A:
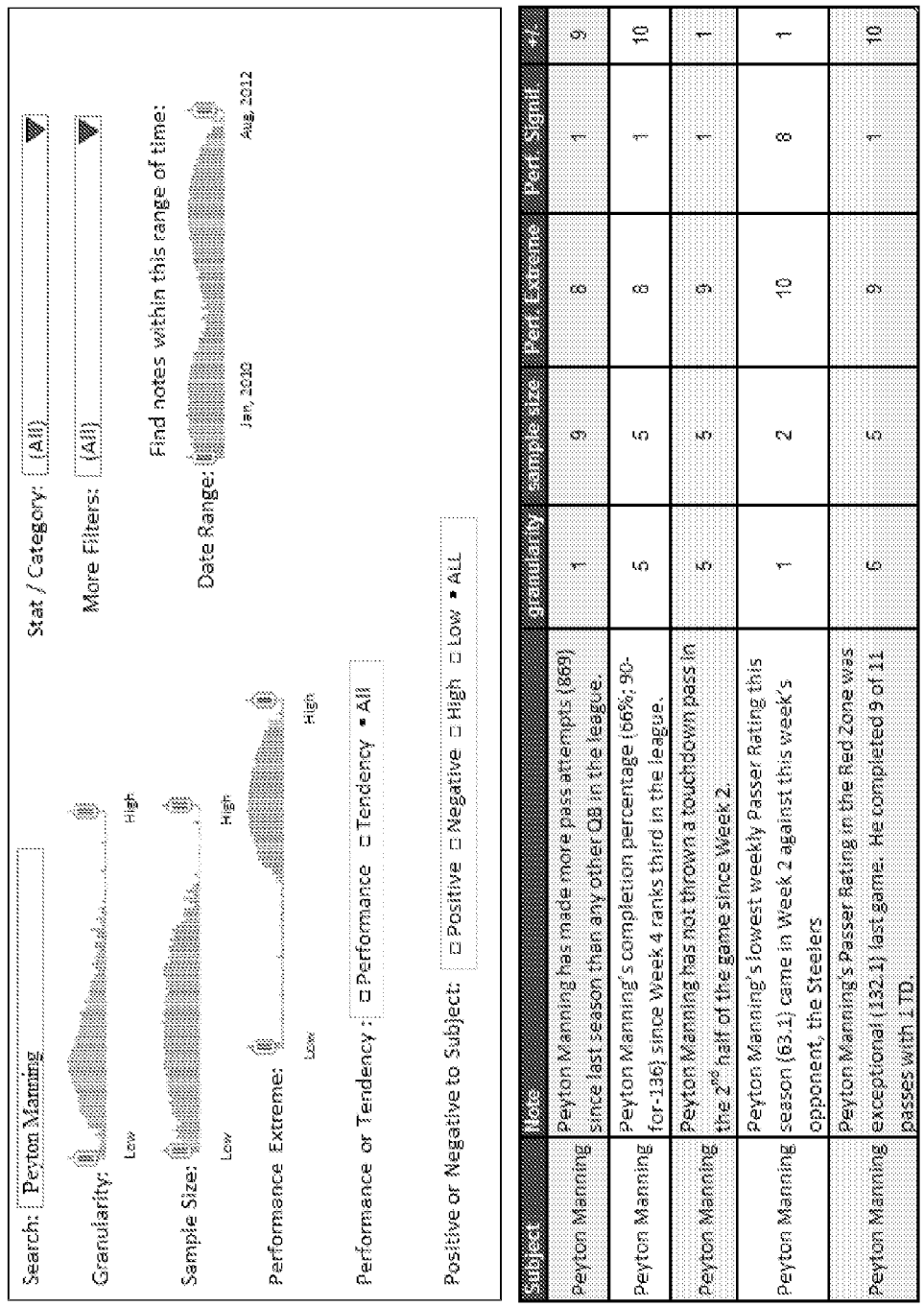
FIG. 5a is an example of a user interface for a football application of the performance assessment application.
Figure 5B:
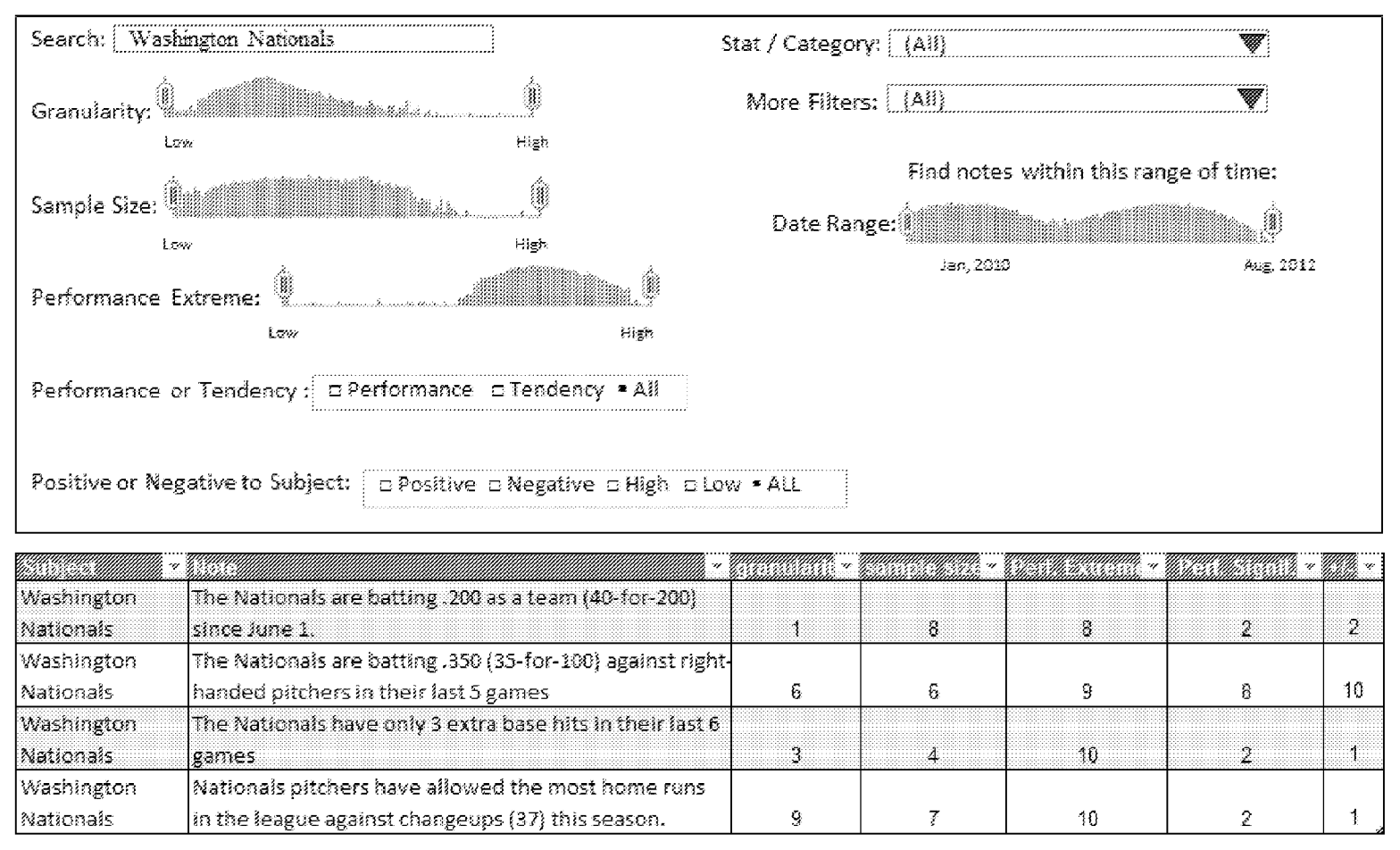

Referring to FIGS. 5a-b, additional sample user interfaces demonstrate the use of processing application 101. As illustrated, user platforms may be interactive such that users may search and research rather than viewing summaries and recaps. Searching for automated notes in a single player is illustrated in FIG. 5a, while searching for automated notes reflecting an entire team/league is illustrated in FIG. 5b.

Figure 7A:
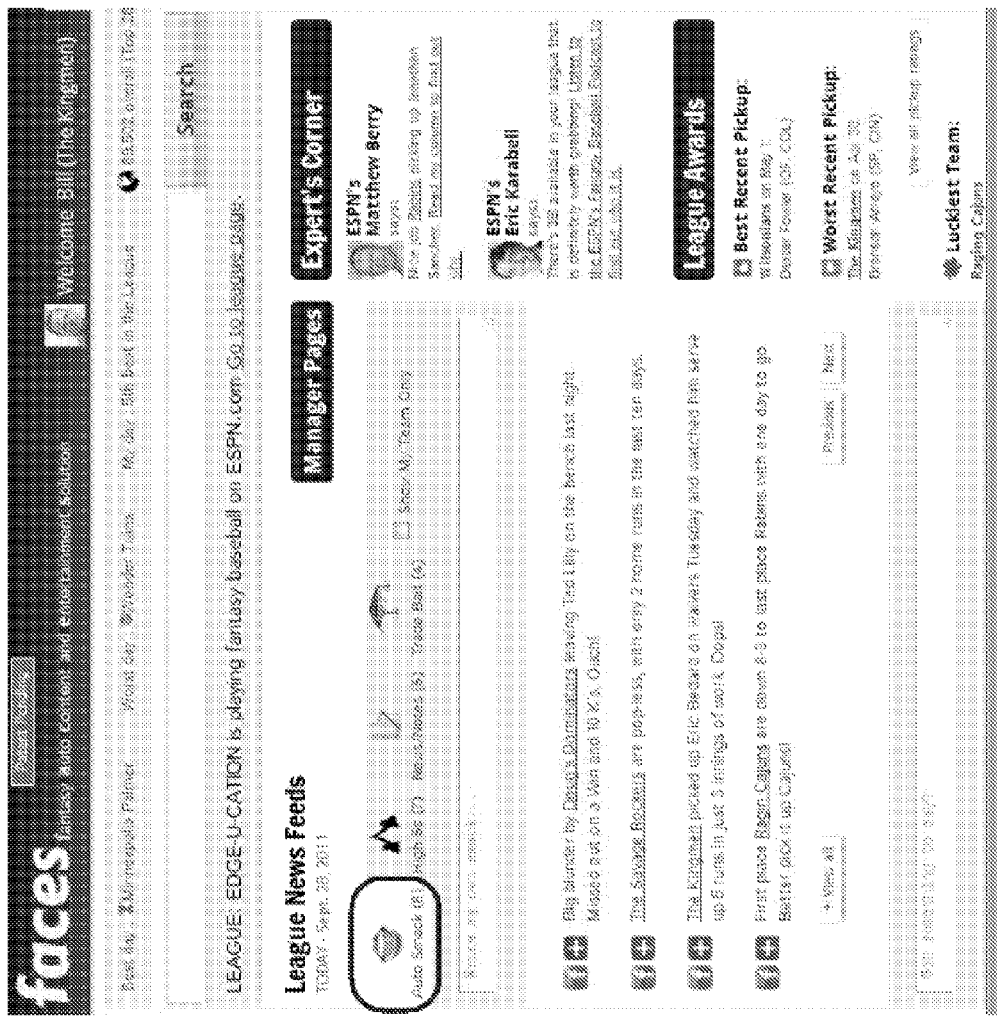
Figure 7B:
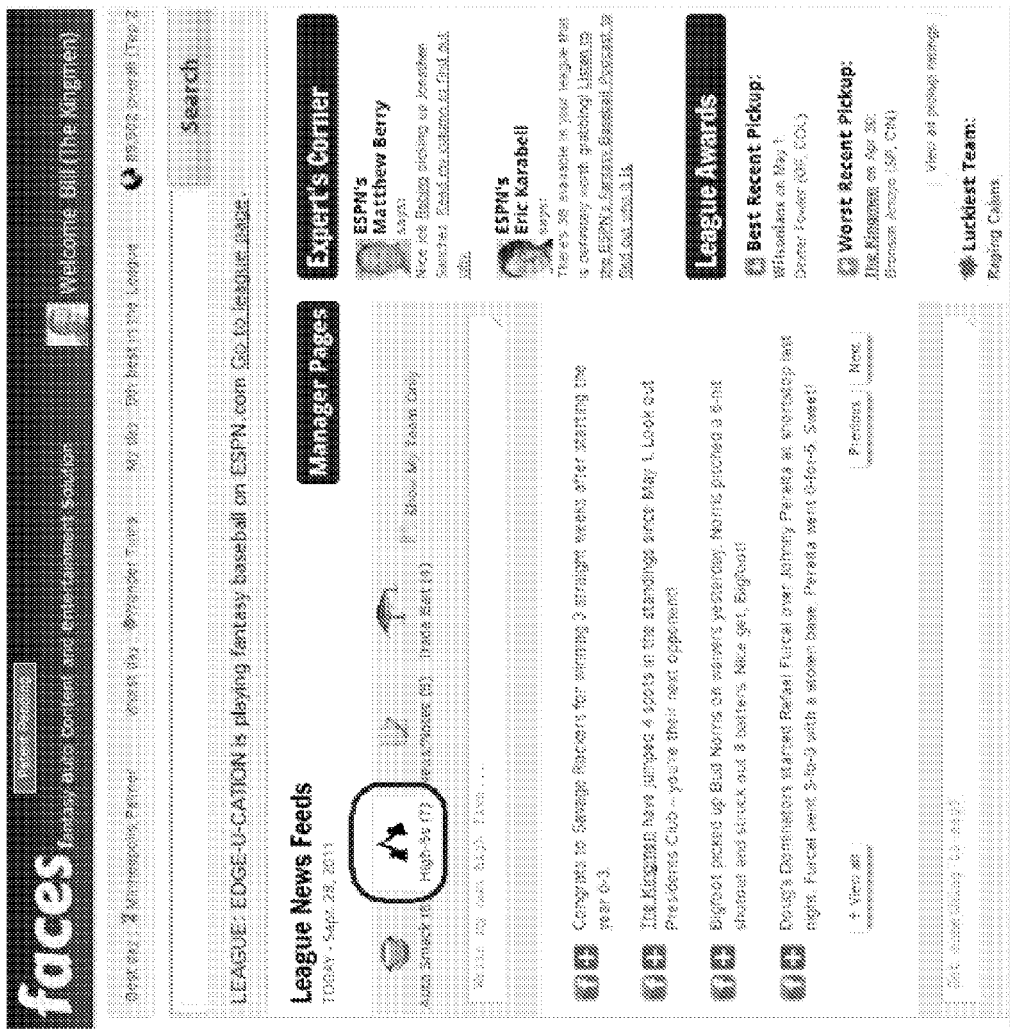
Figure 7C:
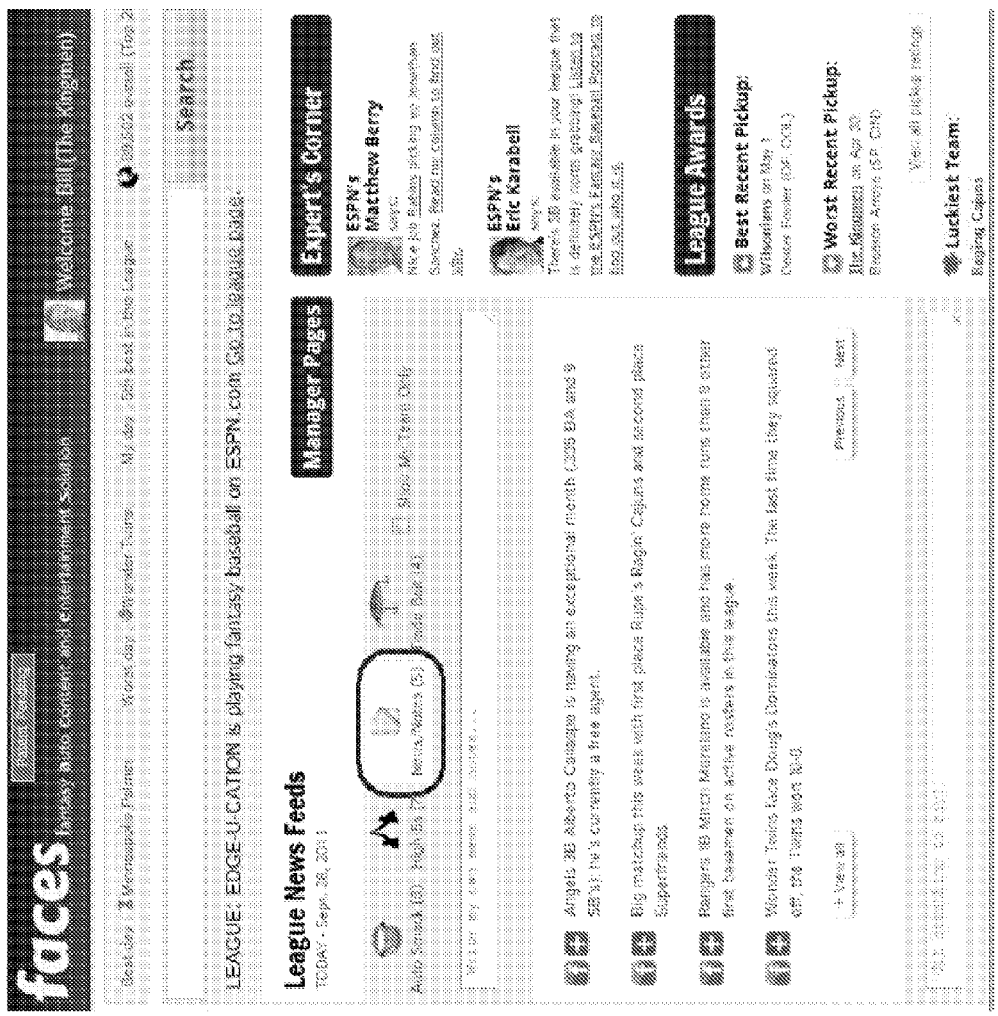
Figure 7D:
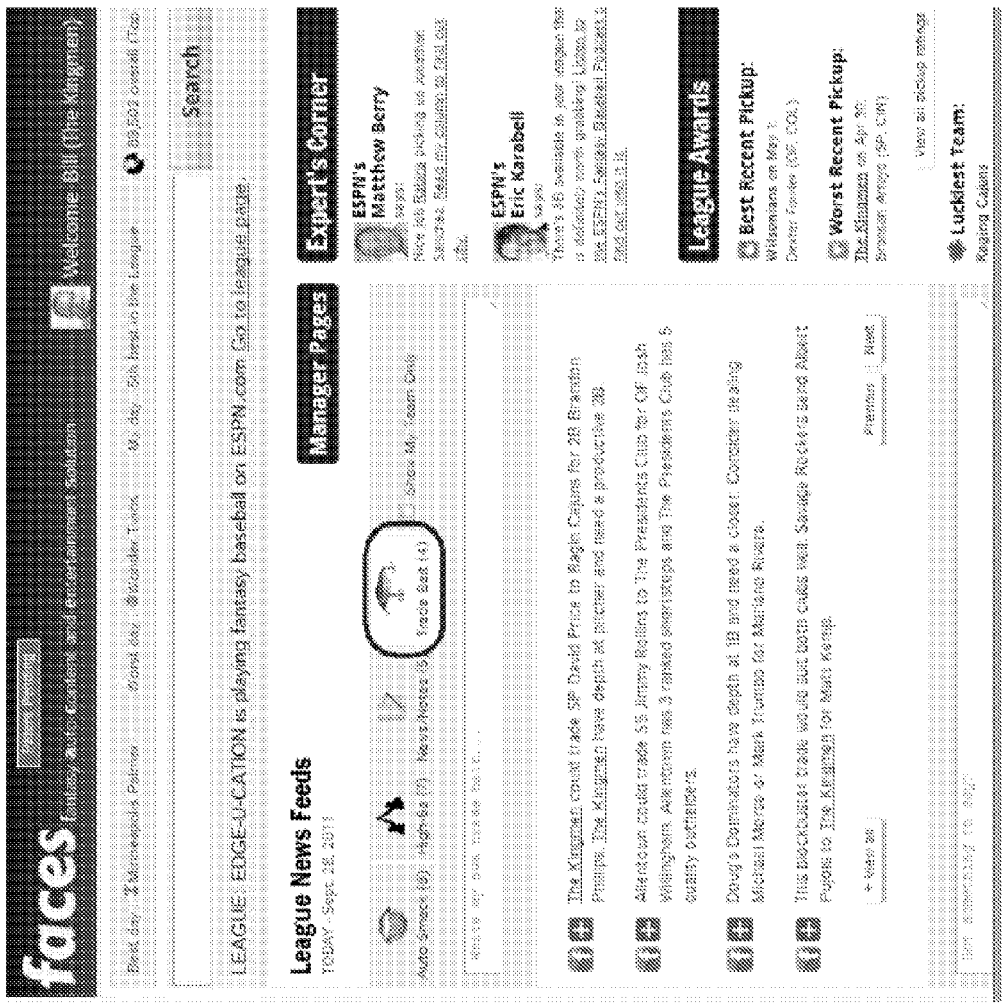
Figure 7E:
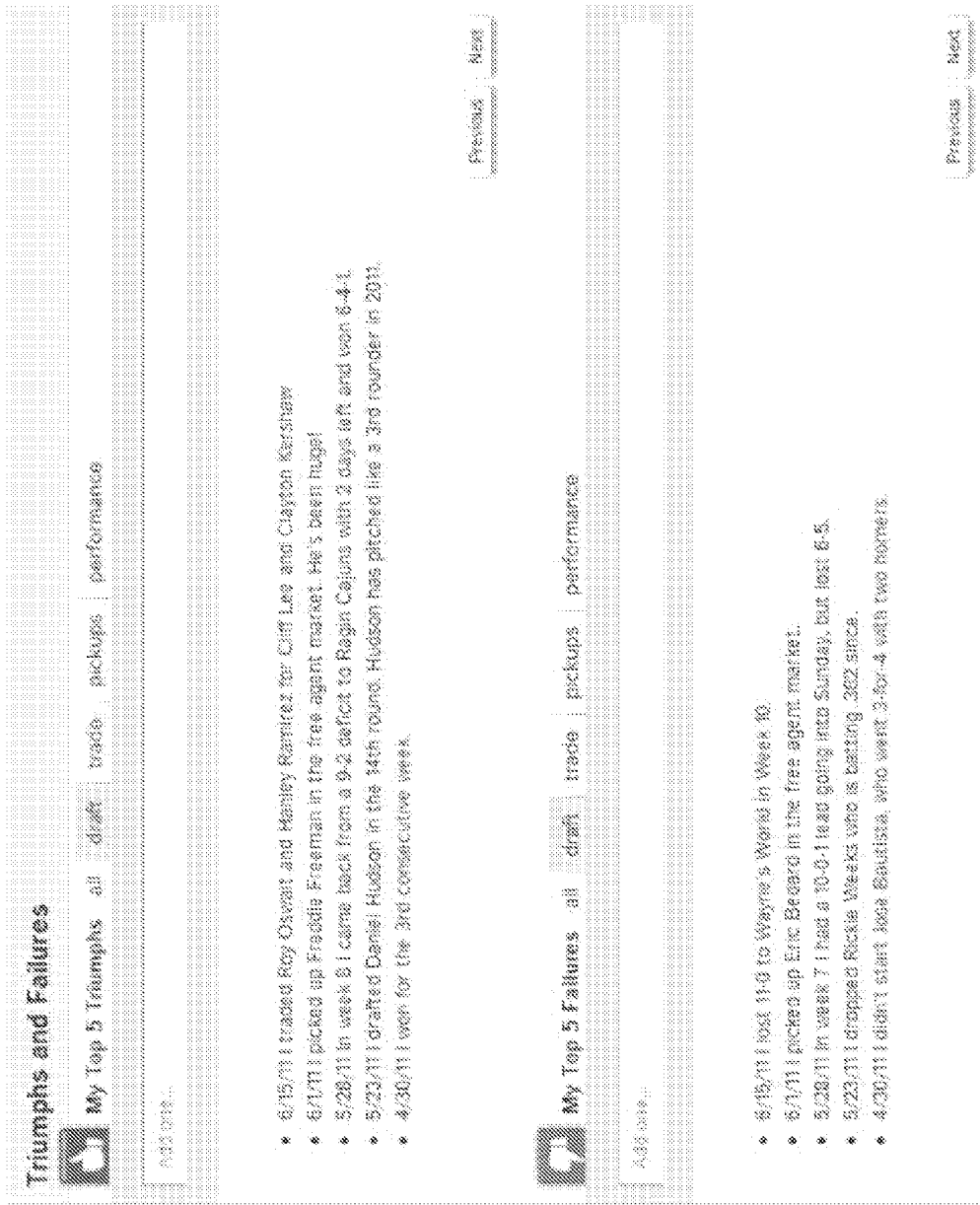

Turning to FIGS. 7a-7g, exemplary applications of AutoNotes are shown. AutoNotes may be particularly suitable for popular fantasy sports leagues, where stats are crucial to users of the leagues. AutoNotes can be used to critique user actions in the form of Auto Smacks, shown in FIG. 7a or High-5s in FIG. 7b or Triumphs and Failures in FIG. 7e, or as general notes, as shown in FIG. 7c or as trade suggestions in FIG. 7d. AutoNotes can also be used for Report Cards, as shown in FIG. 7f or team ratings, as shown in FIG. 7g.

Figure 8:
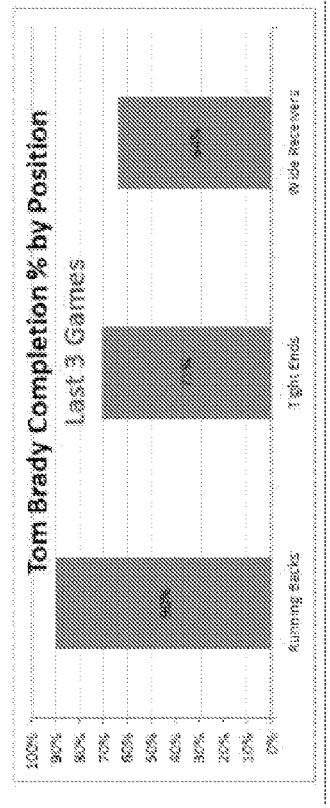
FIG. 8 is another example of a user interface of the performance assessment application.

Turning to FIG. 8, a "drill down" feature may be added to an AutoNote application, which enables a user to drill down on a particular AutoNote for additional information. For example, for the AutoNote, "Tom Brady has completed 80% of his passes in the last 3 games," a button or click event can trigger either more notes related to that, or a table of information. For example: In the last 3 games: 90% completions to running backs; 71% to Tight Ends; 64% to Wide Receivers; 88% to left side; 77% to middle of field; 59% to right side, etc. . . .

Although the previous embodiments were discussed primarily using athletic performance assessment data, those skilled in the art would appreciate that alternative platforms 106 may benefit from processing application 101. This may be shown in the following examples:

EXAMPLE 1

Using weight loss/physical fitness, category prioritization (action block 2030) may apply the standard classification scheme to physical fitness assessment data. Granularity places priority on notes according level of detail: high granularity (e.g., routine workouts to generate "Susan has burned an average of 2000 calories while bike riding on Sundays in the past 10 weeks."); medium granularity (e.g., time-frame split diet to generate "Susan had 8 servings of vegetables since last Tuesday."); and low granularity (e.g., single performances to generate "Susan ran 2 miles today.").

Sample size significance classifies notes as follows: highly significant sample size (e.g., with a sample size of one year, "Susan has lost 30 pounds (25 percent of her starting weight) in the last 365 days."); medium sample size significance (e.g., with a sample size of a month, "Susan's weight has decreased from 140 pounds to 135 pounds this month."); and low sample size significance (e.g., single day to generate "Susan did not exercise today.").

Performance extremes classifies notes as follows: highly extreme (e.g., superlative ranking, "Susan ranks 1st among her friends in percentage pounds lost in October (2% loss)."); medium extreme (e.g., "Susan's ranks 7th among her 15 friends in percentage weight lost since September (0.8% loss)."); and low extreme (e.g., average performance, "Susan ranks in the 50th percentile among users of this application with an average of 1 serving of fruits per day this week.").

Using a time-based circumstance, an example of highly circumstantial significance to a single day: "Susan's toughest day for exercise is Wednesday. Try to get out there today (Wednesday) Susan!" Classifying notes having a positive/negative impact includes: positive impact to fitness (e.g., "Susan lost 30 pounds (25 percent of her starting weight) in the last calendar year. Way to go Susan!"); and negative impact (e.g., "Susan has not exercised in the past 3 days.").

EXAMPLE 2

Using interactive gaming (e.g., online video poker), category prioritization (action block 2030) may apply the standard classification scheme to gaming assessment data. Granularity places priority on notes according level of detail: high granularity (e.g., specific event to generate "You have averaged +20 credits when being dealt a pair of sevens or lower this month. The average player is even." or "User has hit the green 18 of 20 times with his drive on the par-three 18th hole at Sawgrass in Tiger Woods Golf"); medium granularity (e.g., less detailed event to generate "You have been dealt a pair 30 percent of the time this week. The average player is dealt a pair 20 percent of the time." or "You have won the last 4 times you played John Smith and used Roy Halladay as your starting pitched in MLB The Show."); and low granularity (e.g., general detail to generate "You averaged –25 credits this week." or "You have won the last 4 times you played John Smith in Modern Warfare II.").

Sample size significance classifies notes as follows: highly significant sample size (e.g., multiple attempts, "You won 295 hands and lost 304 hands since June 1. That 49.2% winning hand percentage ranks in the 10th percentile among players of this game." or "Your overall record is 43 wins and 20 losses in Madden Football over the past calendar year."); medium sample size significance (e.g., mid-size sample, "You won 10 of 20 times today when being dealt an Ace with no pair." or "Your defense is allowing just 2.2 yards per carry in Madden Football in the past 15 games."); and low sample size significance (e.g., a few events "You have only 1 win in the last 10 hands." or "Your team has averaged 360 yards passing in the last 3 games of Madden Football.").

Performance extremes classifies notes as follows: highly extreme (e.g., superlative ranking, "Between June 1 and June 15, your total winnings are +3000." or "Your record is 0 wins and 20 losses in Grand Theft Auto."); medium extreme (e.g., "You received a 3-of-a-kind 12 times in 65 hands (18%) when being dealt a pair. The average player gets 3-of-a-kind 14% of the time." or "Your record is 12 wins and 8 losses in Grand Theft Auto."); and low extreme (e.g., average performance, "Your record is 10 wins and 10 losses in Grand Theft Auto.").

Classifying notes having a positive/negative impact includes: positive impact to game strategy (e.g., "You were dealt a Big Hand (straight or better) 10 times in the last 125 deals for a gain of 1250." or "Your pitchers are averaging 11 strikeouts per game (normal average is 6 per game) since Jun. 1, 2011 in MLB the Show."); and negative impact (e.g., "You have a current streak of 7 straight days with negative earnings, totaling −950." or "Your pitchers are averaging 3 strikeouts per game (normal average is 6 per game) since Jun. 1, 2011 in MLB the Show.").

EXAMPLE 3

Using finance, category prioritization (action block 2030) may apply the standard classification scheme to stock market assessment data. Granularity places priority on notes according level of detail: high granularity (e.g., specific stock event "The most volatile stock in the S&P 500 in the past 60 days has been Netflix (NFLX), with a high of 242 and a low of 129 in that timeframe."); medium granularity (e.g., smaller time split "Citigroup (C) stock has risen 2.9% in the last 30 days; the rest of the banking sector is down −12.3%."); and low granularity (e.g., general stock trend "Shares of Verizon (VZ) are down 9 percent since May 1.").

Sample size significance classifies notes as follows: highly significant sample size (e.g., "Southwest Airlines (LUV) stock has been positive 210 days and negative 103 days in the last calendar year."); medium sample size significance (e.g., "The biggest large-cap gainer in tech stocks in the past 120 days has been Cypress Semiconductor (CY) with a 25.6% increase."); and low sample size significance (e.g., "Shares of Bank of America (BAC) have risen 10 percent in the last three days.").

Performance extremes classifies notes as follows: highly extreme (e.g., superlative ranking, "If you purchased 100 shares of Apple (AAPL) on Jan. 1, 2011, you have made $1,000 profit (+69%) as of today."); medium extreme (e.g., "If you purchased 100 shares of PepsiCo (PEP) on Jan. 1, 2011, you have made $20 profit as of today (+0.02%)."); and low extreme (e.g., average performance, "If you purchased 100 shares of Nokia (NOK) on Mar. 1, 2011, you've lost $1,605 (−105%) as of today.").

Using a time-based circumstance, an example of highly circumstantial significance to a single day: "Following a 4% or more price decrease such as yesterday's, General Electric (GE) tends to rise 3.2 percent the following day (9 such occurrences)." Classifying notes having a positive/negative impact includes: positive impact to investment strategy (e.g., "Wal-Mart (WMT) has gained 20.2 percent in the past six weeks."); and negative impact (e.g., "Home Depot (HD) is down 18 percent in the past six weeks.").

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for athletic-based performance assessment data, such as fantasy sports; however, the invention can be used for any performance assessment data. Additionally and obviously, features may be added or subtracted as desired. Accordingly, the invention is not to be restricted except in light of the attached claims and their equivalents.

What is claimed is:

1. A web-based automated notes and categorization system comprising:
   an electronic database having raw performance assessment data associated with a plurality of entities that collectively form a competitive federation, wherein the raw performance assessment data is collected from one or more data sources;
   wherein the electronic database is operatively coupled to a computer program product having a computer-usable medium having a sequence of instructions which, when executed by a processor, causes said processor to execute an electronic process that analyzes and converts said raw performance data;
   said electronic process comprising:
      datamining said performance assessment data for data relevant to a performance statistic and an associated contextual split for said performance statistic for each of the plurality of entities;
      summarizing said data into said performance statistic and associated contextual split for each entity, wherein each performance statistic has a sample size, and further wherein the associated contextual split defines a subset of said performance statistic based on one or more parameters;
      ranking each entity according to the summarized data associated with the associated performance statistic;
      identifying a strength value for each performance statistic based on the ranking of the associated entity, the associated contextual split, and associated sample size; and
      generating a plain language note for the entity with the highest strength value, wherein the plain language note includes a textual summary of the entity's performance statistic, contextual split, and ranking, wherein said plain language note is accessible to a plurality of users and servers over a public network.

2. The system of claim 1, further comprising a secondary database having user-generated (secondary) performance assessment data.

3. The system of claim 1, wherein the plain language note includes a historical trend of said summarized data.

4. The system of claim 3, wherein the historical trend is user-defined by beginning and end time periods.

5. The system of claim 1, wherein the process is further configured to post the plain language note to one or more third party social media networks.

6. The system of claim 1, wherein the one or more parameters is a specific time frame.

* * * * *